United States Patent [19]
Hain et al.

[11] Patent Number: 5,876,023
[45] Date of Patent: Mar. 2, 1999

[54] VIBRATION ISOLATION INSERT FOR AIRCRAFT FLOOR PLANELS AND THE LIKE

[75] Inventors: Harry L. Hain, Erie, Pa.; Michael D. Clark, Redmond, Wash.

[73] Assignees: Lord Corporation, Cary, N.C.; The Boeing Co., Seattle, Wash.

[21] Appl. No.: 715,677

[22] Filed: Sep. 18, 1996

[51] Int. Cl.⁶ ........................................................ F16F 7/00
[52] U.S. Cl. .................................. 267/141.4; 267/140.4; 267/293; 244/119
[58] Field of Search ............................ 267/141.1, 141.4, 267/141.7, 153, 293; 248/635; 296/35.1; 244/119; 411/537, 544, 383; 403/225, 226, 228

[56] References Cited

U.S. PATENT DOCUMENTS

| | | | |
|---|---|---|---|
| 2,716,566 | 8/1955 | Thiry | 2387/85 |
| 2,720,374 | 10/1955 | Hutton | 267/141.1 |
| 2,800,948 | 7/1957 | Omon et al. | 155/57 |
| 2,869,811 | 1/1959 | Boschi | 248/9 |
| 2,890,846 | 6/1959 | Schloss | 267/141.4 |
| 3,912,206 | 10/1975 | Jong | 248/24 |
| 4,033,533 | 7/1977 | Evrard | 248/358 R |
| 4,196,775 | 4/1980 | Groh | 165/68 |
| 4,258,896 | 3/1981 | Kato et al. | 248/573 |
| 4,286,642 | 9/1981 | Keatley | 411/112 |
| 4,352,520 | 10/1982 | Stiglmaier et al. | 296/182 |
| 4,442,647 | 4/1984 | Olsen | 52/393 |
| 4,521,004 | 6/1985 | Caldwell | 267/141.4 |

(List continued on next page.)

FOREIGN PATENT DOCUMENTS

| | | |
|---|---|---|
| 0 279620 A2 | 8/1988 | European Pat. Off. . |
| 524203 | 8/1940 | France . |
| 1.089.844 | 3/1955 | France . |
| 2526728 | 11/1983 | France . |
| 2 717 237 A1 | 9/1995 | France . |
| 2730973 | 8/1996 | France . |
| 829 388 | 1/1952 | Germany . |
| 8424307 | 10/1985 | Germany . |
| 40 24 696 C1 | 7/1991 | Germany . |
| 196 05 859 A1 | 8/1997 | Germany . |
| 196 05 859 A1 | 8/1997 | Germany . |
| 1566632 | 5/1980 | Japan . |
| 01015540 | 1/1989 | Japan . |
| 01126447 | 5/1989 | Japan . |
| 2062804 | 5/1981 | United Kingdom . |
| 2074289 | 10/1981 | United Kingdom . |

OTHER PUBLICATIONS

Shipman, White and Cronkhite, Bell Helicopter Company, *Fuselage Nodalization*, Presented at the 28th Annual National Forum of the American Helicopter Society, May, 1972.

Desjardins and Sankewitsch, Boeing Vertol Company, *Floor and Fuel Vibration Isolation Systems For The Boeing Vertol Commercial Chinnok*, Journal of the American Helicopter Society, Apr.1981.

*Primary Examiner*—Chris Schwartz
*Attorney, Agent, or Firm*—Randall S. Wayland; Richard K. Thomson

[57] ABSTRACT

An insert used to connect aircraft floor panels, and the like, to supporting structure includes features which function to isolate the supported panel from vibrations in the supporting structure. The isolation of the panels leads to reductions in SIL (Speech Interference Level) noise within aircraft cabins. The insert consists of internal and external rigid components separated by a contoured elastomeric component. The elastomeric component is preloaded when installed via a fastener extending through the inner rigid component and attaching to the supporting structure. The outer and inner rigid components are sized such that the inner rigid component will not pass through the outer rigid component, thus providing a safetied installation of the panel. The elastomeric component extends below the bottom of the outer rigid component and provides soft snubbing against the supporting structure during loading of the panels. This allows some level of isolation while restricting motion of the panels.

9 Claims, 2 Drawing Sheets

U.S. PATENT DOCUMENTS

| | | | |
|---|---|---|---|
| 4,522,378 | 6/1985 | Nelson | 267/141.4 |
| 4,693,457 | 9/1987 | Kamata | 267/153 |
| 4,739,955 | 4/1988 | Aquino et al. | 244/129.4 |
| 4,799,631 | 1/1989 | Humphries et al. | 244/118.5 |
| 4,821,828 | 4/1989 | Schwerzler et al. | 180/68.4 |
| 4,858,880 | 8/1989 | Durand | 248/635 |
| 4,971,496 | 11/1990 | Scholz | 411/105 |
| 5,085,382 | 2/1992 | Finkenbeiner | 244/118.1 |
| 5,110,081 | 5/1992 | Lang, Jr. | 248/635 |
| 5,127,698 | 7/1992 | König | 296/35.1 |
| 5,131,619 | 7/1992 | Daugherty et al. | 248/635 |
| 5,131,638 | 7/1992 | Hein et al. | 267/293 |
| 5,181,736 | 1/1993 | Kokubun | 267/293 |
| 5,190,269 | 3/1993 | Ikeda et al. | 267/293 |
| 5,201,831 | 4/1993 | Higgins et al. | 244/119 |
| 5,222,694 | 6/1993 | Smoot | 244/119 |
| 5,314,144 | 5/1994 | Porter, Jr. et al. | 244/132 |
| 5,330,124 | 7/1994 | Le Touche | 244/117 |
| 5,335,893 | 8/1994 | Opp | 248/635 |
| 5,397,206 | 3/1995 | Sihon | 411/544 |
| 5,409,283 | 4/1995 | Ban | 296/35.1 |
| 5,580,028 | 12/1996 | Tomczak et al. | 267/293 |

VIBRATION ISOLATION INSERT FOR AIRCRAFT FLOOR PLANELS AND THE LIKE

BACKGROUND AND SUMMARY OF THE INVENTION

The present invention relates to an insert for an aircraft floor panel, or the like, used to attach the panel to a supporting structure. More particularly, the present insert has the capability to isolate the panel from the vibrational energy propagated through its support.

It has been determined that a large contribution to speech interference level (SIL) noise, in certain commercial aircraft, is radiated by the floor panels. Apparently, the vibration that is transmitted along the beams which support the panels effectively vibrate the panel similar to the way a speaker diaphragm is vibrated. In order to reduce weight, these panels are typically made of an aluminum honeycomb, or other highly rigid constructions, that are highly susceptible to vibration. One current method of attaching these panels to the support beams employs metal inserts that are staked to the floor panel and secured to the upper surface of the support beam using a screw inserted through the insert and threaded into a clip nut. This technique amounts to hard mounting the panel to the support providing a solid path for transmission of vibration.

The present invention significantly reduces SIL noise within the passenger compartment. The attachment insert of the present invention comprises a) a substantially cylindrical rigid outer member secured in an aperture in the floor panel and having an axial throughbore defining a minimum internal dimension of said outer member; b) a contoured elastomeric member bonded to said axial throughbore, said elastomeric member having a central axial opening therethrough and a portion surrounding the central axial opening that extends below a lowermost portion of said outer member; and c) a rigid inner member having a substantially cylindrical first portion of a first diameter which is press fit into said central axial opening of said elastomeric bushing and a shorter cylindrical second portion which has a second larger diameter than said first portion, said second portion generally overlying said contoured elastomeric member, rigid inner member having an axial fastener-receiving throughbore permitting attachment to said support. The outer diameter of the second portion is greater than the minimum internal dimension of the first member. As a result, the insert of the present invention is safetied against possible loss of elastomer integrity. The outer member has a flange which is used to bond the insert to the lower surface of the panel and provides pull-through resistance.

The contoured elastomer has a sleeve portion that extends along the outer periphery of the shank of the inner member and has a longer axial extent than said shank. In addition, the elastomeric member has a solid annulus that extends below the surface of the flange of the outer member. The excessive length of the sleeve results in the elastomer being preloaded in its secured position. The annulus provides a snubbing ring for the panel when the panel is loaded as by a passenger walking, a beverage/food cart, or by carry-on luggage placed beneath the seat. The annulus prevents the loading of the panel from creating a solid path; accordingly, the panel remains isolated from the vibrating support surface such that the SIL noise in the passenger compartment is still reduced.

Various other features, advantages and characteristics of the present invention will become apparent after a reading of the following specification.

BRIEF DESCRIPTION OF THE DRAWINGS

Preferred embodiments of the present invention are described in accordance with the attached drawings in which.

DETAILED DESCRIPTION OF THE PREFERRED EMBODIMENTS

Figure 2:
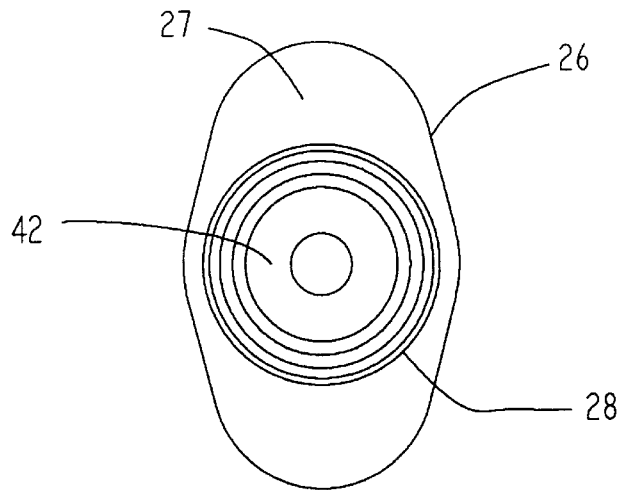
FIG. 2 is a top view of the first embodiment of the insert, approximately, actual size.
Figure 1:
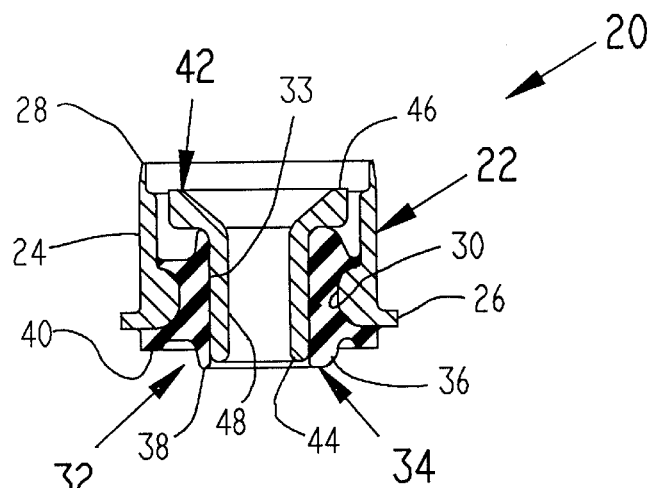
FIG. 1 is a cross-sectional front view of a first embodiment of the insert of the present invention as seen along line 1—1 in FIG. 3.
Figure 3:
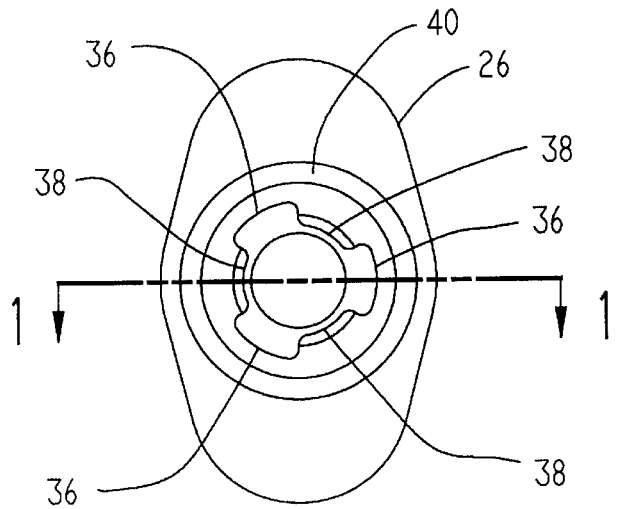
FIG. 3 is a bottom view of the first embodiment of the insert.
Figure 4:
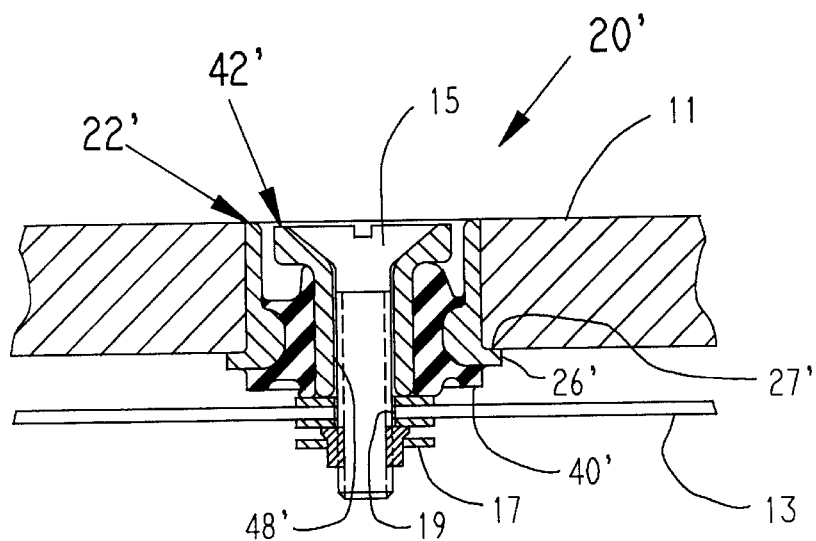
FIG. 4 is a cross-sectional front view of a second embodiment of the insert shown installed in a panel.

A first preferred embodiment of the present invention is shown in FIG. 1 generally at 20. Rigid outer member 22 is shown as having a substantially cylindrical body portion 24 and a flange 26 which extends from a lower edge. Other shapes could, of course, be used; however, cylindrical will generally be preferred for ease of placement in the floor panels 11 (FIG. 4). Drilling a round hole will be simpler than punching out some other shape. The upper rim 28 of cylindrical body portion 24 has a reduced wall thickness that will be rolled over in a staking operation to secure it to panel 11. In addition, an adhesive will be applied to the upper surface 27 of flange 26 (FIG. 2) to secure it to the lower surface of panel 11.

Rigid outer member may be metallic, made of metals including aluminum, powdered titanium, or similar light weight metals, in which case the staking operation is mechanical. As an alternative, rigid outer member 22 may be made of an engineered plastic, such as ULTEM available from GE, for example. With such a plastic, an ultrasonic staking procedure can be used to form the upper flange to capture plate 11. Certain composites may also be appropriate for making the rigid members of this invention, such as glass or carbon fiber reinforced plastics. Rigid outer member 22 has a minimum internal dimension formed by inwardly projecting annulus 30.

A contoured elastomeric member 32 is bonded to an internal portion of rigid outer member 22. This bond may be either chemical in nature, i.e., produced using an adhesive, or mechanical, i.e., the elastomer may be molded in place. The elastomer is preferably one which will provide medium damping and has reasonable low temperature flexibility. A suitable elastomer is available from Lord Corporation and is identified as SPE®I. A portion of the elastomeric member 32 is contained within rigid outer member 22 and a portion extends beneath member 22. The elastomeric member 32 has a first predetermined axial length extending along the axis of the rigid outer member 22 and a central axial opening 33 that extends therethrough. The portion extending below member 22 is an annulus 34 made up of a plurality (preferably three) of load bearing portions 36 with a like plurality of intermediate bridging portions 38. An annular ring 40 underlies a portion of rigid outer member 22. The portion of the elastomeric member 32 contained within the rigid outer member has a configuration identical to that of annulus 34 with the exception of the absence of a ring corresponding to ring 40.

A third element of insert 20 is rigid inner member 42. Inner member 42 is preferably made of the same material as that used for rigid outer member, although a different material could be used. Rigid inner member 42 has a first generally cylindrical portion 44 having a first outer diameter that is press fit into central axial opening 33. Inner member 42 has a second shorter generally cylindrical portion 46 which has a diameter which overlies the elastomeric member 32. The maximum diameter of second cylindrical portion 46 exceeds the minimum internal dimension of annulus 30. In this manner, insert is safetied against the possible loss of integrity of the elastomeric member 32, i.e., the floor panel 11 cannot lift up off of the support 13 to which it is attached. Inner rigid member 42 has an axial fastener-receiving throughbore 48. The operation of insert 20 will be described in conjunction with the second embodiment.

FIG. 4 depicts a second embodiment generally at 20'. In this embodiment, the upper rim used to roll over on the panel 11 is omitted. The adhesive applied to upper surface 27' of flange 26' is sufficient to secure the panel in place making the staking operation unnecessary, resulting in significant savings in installation cost and time. All other features of this embodiment are identical to the first embodiment. As shown in FIG. 4, floor panel 11 is secured to the upper flange 13 of an I-beam support by a threaded fastener 15 and a clip nut 17. Nut 17 is slipped over flange 13, a hole 19 having been drilled in therein. Screw 15 is then inserted through fastener-receiving throughbore 48', and the insert 20' and panel 11 which is adhered thereto, are fastened to support flange 13 by threading screw 15 into clip nut 17. The predetermined axial length of the elastomeric member 32 exceeds the length of rigid inner member 42 (FIG. 1). Accordingly, as the fastener 15 is tightened, the elastomer of member 42 will be preloaded assuring continuous contact and consistent performance.

Elastomeric member 32' isolates outer member 22' from inner member 42' and, hence, floor panel 11 from support flange 13. Accordingly, certain vibrations being transmitted through flange 13 will not be transmitted into the floor panel 11 or the associated passenger compartment. The panel 11 will normally occupy an elevated position relative to flange 13 as depicted in FIG. 4. Should the panel be subjected to loading due to, for example, someone walking on it, beverage cart passing across it or carry-on luggage being stored on panel 11, the elastomer around load-carrying protrusions 36 will permit the panel to deflect downward until ring 40' engages flange 13. Ring 40' gently snubs this movement and even when under load, the panel 11 remains isolated from flange 13.

Figure 5:
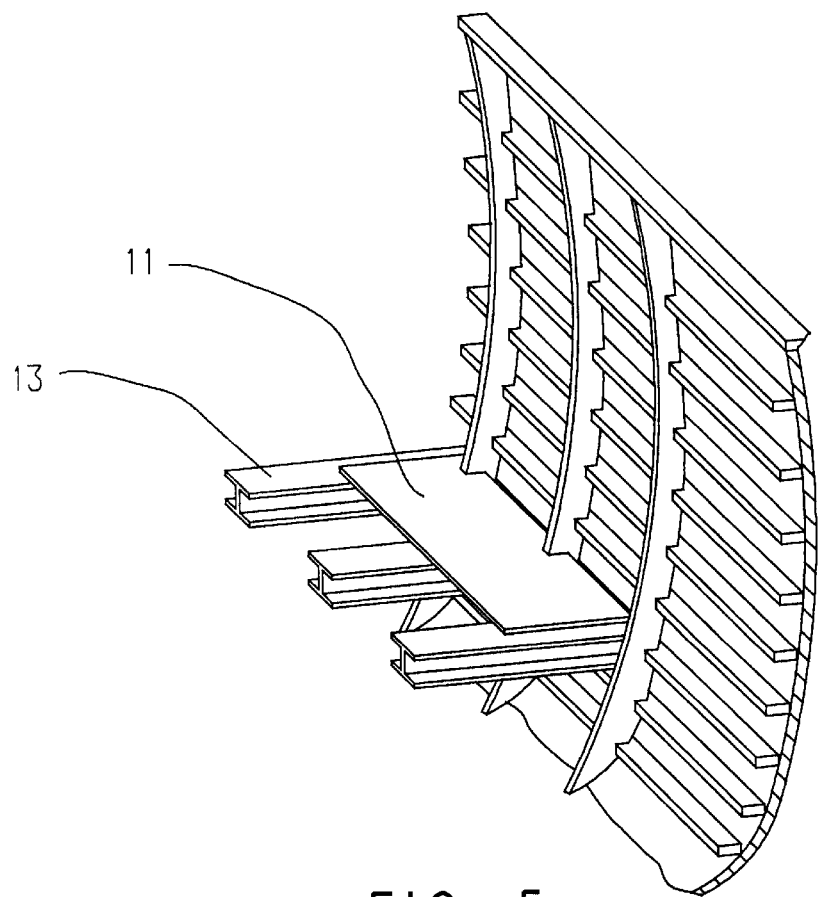
FIG. 5 is an isometric view of the aircraft fuselage depicting the placement of a floor panel across a plurality of beams.

Flight tests of the present insert 20 demonstrated SIL noise reductions in the passenger compartment including approximately 5 decibels in the 500 Hz range and 10 dB at each of the 2000 Hz and 4000 Hz levels. Approximately forty inserts 20 are used to secure a 2'×4' floor panel 11 in position as depicted in FIG. 5. The inserts 20 used in the test employed outer and inner rigid members 22 and 42 that were made of aluminum.

Various changes, alternatives and modifications will become apparent to a person of ordinary skill in the art after a reading of the foregoing specification. It is intended that all such changes, alternatives and modifications as come within the scope of the appended claims be considered part of the present invention.

What is claimed is:

1. An insert securing an aircraft floor panel to a support structure wherein vibrations transmitted by said support structure are isolated from said floor panel, said insert comprising a) a substantially cylindrical rigid outer member secured in an aperture in said aircraft floor panel and having an axial throughbore defining a minimum internal dimension of said outer member;

b) a contoured elastomeric member bonded to said axial throughbore, said elastomeric member having a central axial opening therethrough and an elastomer portion surrounding said central axial opening that extends below a lowermost portion of said outer member, said elastomer portion being positioned proximate to but in nonengaging relationship with said support structure and being deflectable into snubbing engagement with said support structure upon application of sufficient vertical load; and c) a rigid one-piece inner member having a substantially cylindrical first portion of a first diameter which is press fit into said central axial opening of said elastomeric bushing and an integral shorter second portion which has a second larger diameter than said first portion, wherein said second larger diameter of said integral shorter second portion exceeds said minimum internal dimension of said outer member to safety the insert against potential loss of elastomer integrity, said integral second portion generally overlying said contoured elastomeric member, said rigid inner member having an axial fastener-receiving throughbore permitting attachment to said support structure.

2. The insert of claim 1 wherein said cylindrical rigid outer member has a radially directed lower flange which underlies a peripheral portion of said aperture in said floor panel.

3. The insert of claim 2 wherein said lower flange is non-circular.

4. The insert of claim 2 wherein said contoured elastomeric member has an annular portion which underlies at least a portion of said lower flange.

5. The insert of claim 2 wherein said insert is attached to said floor panel by means including adhesive between said lower flange and said floor panel.

6. The insert of claim 5 wherein said attaching means further includes an overlying flange which is configured to overlie a peripheral portion of said aperture in said floor panel.

7. The insert of claim 1 wherein said contoured elastomeric member has a portion which extends below said first portion of said rigid inner member and is configured to receive a preload when said insert secures said aircraft floor panel to said support structure.

8. The insert of claim 7 wherein said portion which extends below said rigid one-piece inner member comprises an annulus made up of a plurality of load bearing portions interconnected by a like plurality of bridging portions.

9. The insert of claim 1 wherein the outer and rigid one-piece inner members are made of a material in a group consisting of metals, engineered plastics, composites and combinations thereof.

* * * * *